3,042,545
EPOXY RESINS AS ADHESIVES FOR BONDING POLYURETHANE TO METAL

Robert N. Kienle, Grosse Pointe, and Daniel T. Szura, Royal Oak, Mich., assignors to United States Rubber Company, New York, N.Y., a corporation of New Jersey
No Drawing. Filed Aug. 12, 1959, Ser. No. 833,138
6 Claims. (Cl. 117—75)

This invention relates to epoxy adhesives and more particularly to the use of epoxy adhesives to bond urethane polymers to a metal surface.

Many applications of polyurethane elastomers demand high degree of adhesion between polyurethane and a metal surface. This is particularly desirable where polyurethanes are used which are cast from a liquid intermediate. The use of liquid polyurethanes or polyisocyanates in intermediate states of cure as adhesives in specialized laminates is well-known in the art. The isocyanates may be used in either the form of cement or as liquid pourable elastomer intermediate. It has been found that even molded or sheet polyurethane possesses a unique adhesion to other elastomeric or resinous materials. A large number of uses for these adhesives and laminates has developed in the electrical, ship, aircraft, building and other industries which require high strength dielectric materials. It has been found however that neither partially cured polyurethanes nor liquid intermediates containing unreacted isocyanate groups have sufficient adhesion to metals to be of wide commercial utility. Thus, when any stress is put upon the metal-polyurethane interface, the basic adhesion of the laminate bond is not of a sufficient quantity to be serviceable.

It is therefore an object of this invention to provide a method for adhering polyurethane resins to metal surfaces.

It is a further object of this invention to adhere liquid intermediates of polyurethane possessing unreacted isocyanate groups to a metal surface.

It is a still further object of this invention to provide a method for adhering a polyurethane resin to a metal surface to form a bond having a bond strength of at least 80 lbs. per inch at a static 90° pull.

It is a specific object of this invention to provide a method of using a 1,2-epoxy resin adhesive for bonding polyurethane resinous materials to a metal surface.

It is a more specific object of this invention to provide a method for adhering a liquid polyurethane intermediate containing unreacted isocyanate groups to a metal surface using a 1,2-polyepoxide adhesive.

It is still a more specific object of this invention to provide a method of adhering a polyurethane resinous material to a metal using a 1,2-polyepoxide adhesive by substantially simultaneously curing the polyurethane and the 1,2-polyepoxide to the metal surface.

It is a further specific object of this invention to provide a method for adhering a polyurethane resinous material to a metal by providing an interlocking fused adhesive bond of a 1,2-polyepoxide and polyurethane.

It is a still further specific object of this invention to provide a method for adhering a polyurethane resinous material to a metal by providing an interlocking fused adhesive bond of polyurethane and a critical amount of a 1,2-polyepoxide to form a bond having a bond strength of at least 80 lbs. per inch at a static 90° pull.

It is a primary object of this invention to provide a laminated structure of a polyurethane with a metal.

It is a further primary object of this invention to provide a laminated structure of a polyurethane resinous material and a metal having an interlocking fused adhesive of a polyurethane and a 1,2-polyepoxide.

It is a principal object of this invention to provide a laminated structure of a polyurethane foam with a metal.

It is a further principal object of this invention to provide a laminated structure of a polyurethane foam with a metal using a 1,2-polyepoxide adhesive.

It is a still further principal object of this invention to provide a method for adhering a polyurethane foam to a metal by providing an interlocking fused adhesive bond of polyurethane and a critical amount of a 1,2-polyepoxide to form a bond having high bond strength.

It has been found possible according to this invention to produce a laminated structure of urethane polymer and metal with an adhesive of a 1,2-polyepoxide interposed between said metal and urethane polymer with a thickness of at least .023 gram per square inch of metal surface said 1,2-polyepoxide and said urethane polymer having molecular bonds mutually penetrating the respective surfaces of the urethane polymer and the 1,2-polyepoxide and having a bond strength of at least 80 lbs. per inch at a static 90° pull. It has further been found possible to provide a method according to this invention for adhering urethane polymers to metal surfaces which comprises coating a metal surface with a layer of a 1,2-polyepoxide resin having a film thickness of at least .023 gram per square inch of metal surface and adhering a polyisocyanate elastomer to said 1,2-polyepoxide resin, said polyisocyanate elastomer and said 1,2-polyepoxide being characterized by an incomplete state of cure and curing the 1,2-polyepoxide resin and polyisocyanate after a mutual bonding has occurred at the surface interface of the 1,2-polyepoxide and the polyisocyanate polymer to form a bond having a bond strength of at least 80 lbs. per inch at a static 90° pull.

More specifically this invention contemplates adhering a liquid intermediate of an incompletely cured polyurethane elastomer having unreacted isocyanate groups or a very soft deformable polyurethane material having reactive groups and film wetting properties to a metal surface having an uncured or partially cured 1,2-polyepoxide with a film thickness of at least .023 gram per square inch of metal surface and co-curing or reacting the polyurethane and 1,2-polyepoxide to form a laminate bond having an increased bond strength whenever considerable stress is applied to the polyurethane-metal interface during service. The necessary and preferred minimum bond strength for the purposes of this invention is at least 80 pounds per inch at a 90° static pull.

In order to produce the novel results of this invention it is necessary that neither one of the polyurethane elastomeric intermediate or the 1,2-polyepoxide cure before a minimum mutual diffusion occurs at the surface interface of the polyurethane and 1,2-polyepoxide. It has been found that a minimum film thickness of at least 0.023 inch of 1,2-polyepoxide is necessary in order to ensure a minimum diffusion of the adhesive into the resinous material while maintaining a sufficient amount of 1,2-polyepoxide at the metal surface for bonding.

Any polyurethane which is thermoplastic and fluid and possesses active isocyanate and curative amine groups may be adhered to any metal with any fluid epoxy resin containing 1,2-epoxide groups and preferably some curative amine groups. In all such cases the bond strength obtained is greater than if no epoxy resin adhesive is used. This is quite surprising since it is well known in the polyurethane art that the presence of chemicals reactive with isocyanates are deleterious to the cured properties of these elastomers unless the molar ratios of isocyanate are adjusted to compensate for their presence. The polyurethan elastomer-1,2-polyepoxide laminates are most effective where maximum interaction can take place between the two laminae. It is preferred according to this invention to form bonds between the polyurethane elastomer and epoxide resin where the interaction is sufficient to obtain a bond strength of 80 pounds per inch width of metal. Such a bond is necessary in practice where the bond is under stress to any extent. To obtain a high degree of interaction, diffusion of the epoxy resin and polyurethane phases into each other must be accomplished before either phase has completely cured; thus the faster the cure rate the faster diffusion must take place. The cure rate is dependent upon the specific reactants used and the temperature of lamination and cure. The diffusion rate depends upon the mutual solubility of the reactants, the temperature of lamination and cure, and the pressure on the system. The mutual solubility in turn will depend upon the nature of the reactants and, in the case of the polymeric reactants, their molecular weight and structure. No quantitative picture can be given which correlates all of these variables. However, those skilled in the art with the fore knowledge of this invention and the principles involved herein can quickly and qualitatively determine the preferred elastomers and resins to use in order to achieve optimum bond strengths.

Representative of the polyisocyanate intermediates and polyurethanes in an intermediate state of cure which can be used according to this invention are:

(I) The castor oil derived polyurethanes, especially those derived from the reaction of castor oil with aromatic diisocyanates such as toluene diisocyanate or diphenylmethane 4,4'-diisocyanate. The formation of a liquid intermediate polyurethane having unreacted isocyanate groups or a "prepolymer" of toluene diisocyanate with castor oil is represented by the following typical equation:

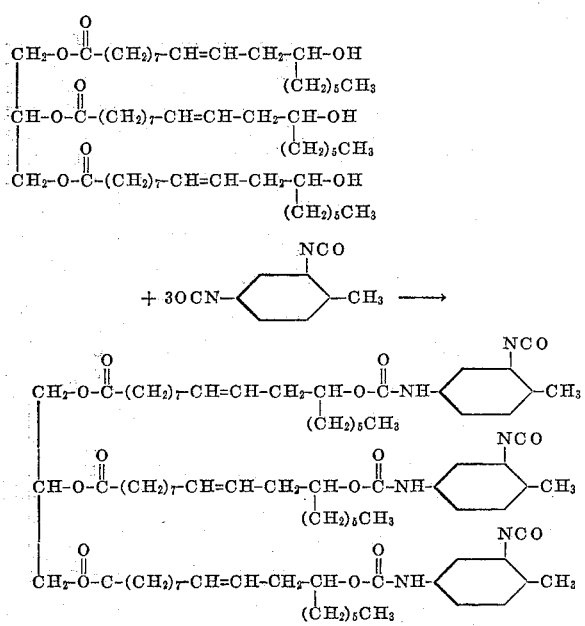

(II) Polyester derived polyurethanes, and in particular the diacid-glycol polyesters which are reacted with aromatic diisocyanates such as toluene diisocyanate, or diphenylmethane 4,4'-diisocyanate. Typical diacids which may be used to form polyesters include adipic acid, sebacic acid, azelaic acid, succinic acid and dilinoleic acid; typical glycols include ethylene glycol, propylene glycol, tetramethylene glycol and hexamethylene glycol. The formation of a "prepolymer" of a polyester derived polyurethane of the reaction product of an adipic acid ethylene glycol polyester and toluene diisocyanate is illustrated by the following equation:

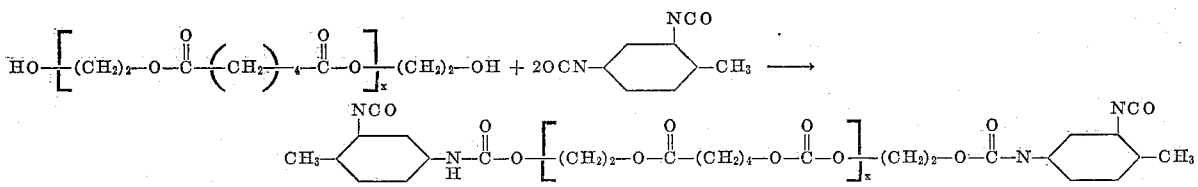

(III) Polyether derived polyurethanes, and in particular the reaction products of polyethyleneglycol, polytetramethylene glycol or polypropylene glycol with aromatic diisocyanates such as 2,4-toluene diisocyanate or diphenylmethane 4,4'-diisocyanate. The formation of a "prepolymer" from the reaction of polyethylene glycol and diphenylmethane 4,4'-diisocyanate is illustrated by the following equation:

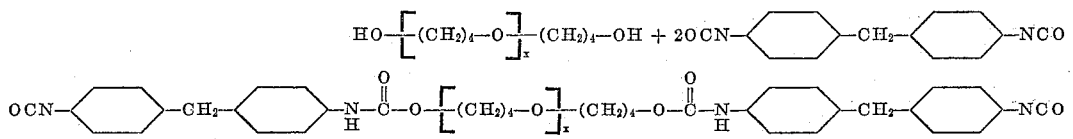

The preferred polyurethane intermediates which may be used in the process of this invention are derived from the reaction products of 2,4-toluene diisocyanate or diphenylmethane diisocyanate with polyesters such as polyethylene adipates, polytetramethylene adipates, polyethylene sebacates or mixed polyesters such as 80/20 polyethylene-propylene adipate and 60/40 polyethylene-tetramethylene adipate containing hydroxyl end groups and of a molecular weight of approximately 2000. Commercial liquid polyisocyanate intermediates of the above mixtures are sold under various trade names. The intermediates known as Adiprene "L" and Vibrathane 6001, 6002, and 6004 have been particularly useful in the practice of this invention.

The ratio of isocyanate to polyester or polyether used to form the liquid polyisocyanate intermediates may vary over a wide range. It is necessary that the number of equivalents of isocyanate exceed the number of equivalents of reactive materials in order to obtain resins having unreacted isocyanate groups. The preferred mole ratio or equivalent ratio is about 1.2 to about 3.0 moles of isocyanate per mole of polyester or polyethers. A still more preferred range is to use from about 1.4 to about 2.6 moles of isocyanate per mole of polyester or polyether. Polyurethane foams are utilized according to the process of this invention by adding appropriate foaming agents such as water to the polyurethane resinous materials. Alternately, the polyurethane elastomer may be whipped in air to produce foaming. The nature of the resulting foam will depend on the quantity of foaming agent used, the viscosity of the polyurethane and the use of surface active agents.

A number of curatives are known for curing polyurethane elastomers. Enhanced adhesion, however, according to the process of this invention has been found to be produced by using amine containing curatives. Examples of such amine curing agents are well known in the art. Representative of this class of compounds are the aliphatic and aromatic amines, beta amino alcohols etc. Amines which have been found that give preferred results according to the process of this invention are 3,3-dichloro-4,4'-diamino diphenylmethane, 3,3'-dichloro-4,4'-diamino diphenyl and ethanol amine. The curative may be added as a separate chemical compound or be "built into" the polyurethane. Examples of the latter class of polyurethanes are the "self curing" polyurethanes. The polyurethane systems of this invention are uncured or partially cured intermediates that still are thermoplastic and flow into curing forms. Curing of the polyurethane is usually carried out by the application of heat. It has been found that, ordinarily, pressure curing is unsatisfactory. High pressure on the laminate bond increases diffusion of the 1,2-polyepoxide into the polyurethane at the surface interface to a point detrimental to the bond. However, in given cases it has been found to be practical to use a pressure cure although it does not give as good a result as a heat cure carried out in a simple closed mold.

Any 1,2-epoxide resin has been found to be applicable as an adhesive to produce the novel results of this invention. Generally the 1,2-polyepoxides which are useful in this invention are obtained by the reaction of phenolic compounds with epichlorohydrin in the presence of a base. The resulting resins may be either bifunctional, trifunctional or tetrafunctional. Representative phenols which may be reacted with epichlorohydrin to obtain 1,2-polyepoxides which are useful in this invention include bisphenol "A," tetrachlorobisphenol "A," diphenolic acid, novolaks, cashew phenols and aliphatic diols and triols. Intermediate degrees of polymerization may characterize the 1,2-polyepoxide, such as when the epoxide chains have multiple functional groups which may interact to produce longer functional chains. Other representative examples of 1,2-polyepoxides which may be used are described in "Epoxy Resins" by Irving Skiest, Reinhold Publishing Corp., 1958 and in U.S. Patents 2,699,402, 2,615,007 and 2,585,115. The 1,2-polyepoxide may be either a liquid or solid. If a solid 1,2-epoxide resin is used it is desirable to dissolve it in a suitable solvent. The concentration of 1,2-epoxide resin in the solvent has a definite effect on the adhesive produced between the polyurethane and the metal surface. This is presumed to be due to the wetting and film-forming properties of the different viscosity levels which are obtained from different concentrations. The wetting and film forming properties will also vary with the chemical structure and molecular weight of the 1,2-epoxide resins. Other 1,2-polyepoxides which have been found to be useful as adhesives in this invention may be formed by the epoxidation of compounds containing unsaturated olefinic bonds, such as the epoxidation synthetic rubbers with peracids.

Any curing agent useful in curing 1,2-polyepoxides may be used in curing the 1,2-epoxide adhesives of this invention. The cure may be carried out in either a "one stage" or "two stage" cure. The preferred class of curing agents are polyfunctional amines. Representative of this class of curing agents are ethylenediamine, diethylenetriamine, triethylenetetramine, tetraethylenepentamine, dicyandiamide, piperidine, N-(hydroxyethyl) diethylenetriamine, primary and secondary aliphatic and aromatic amines, and hydroxylamines. The amount of curing agent which may be employed in the 1,2-polyepoxide resin is not critical and will depend on the nature of the 1,2-polyepoxide and the curative. The optimum ratio of curative to 1,2-epoxide resin has been found to be 6 to 10 parts curing agent per hundred parts resin based on equivalent weights. In particular cases "self curing" 1,2-polyepoxides may be used advantageously as adhesives, in which the curatives are "built into" the 1,2-polyepoxide. Small amounts of conventional fillers may be added to the 1,2-polyepoxide adhesives to aid in distributing the bond stress throughout the filler rather than limiting it to the glue line. Examples of such fillers are well known in the art and include sand, silica, aluminum powder, graphite, asbestos etc.

The preferred enhanced adhesion of the polyurethane elastomeric materials to metals is obtained by using a 1,2-polyepoxide having a minimum thickness of at least .023 gram per square inch of metal. The minimum thickness has been determined on the basis of rates of diffusion of the polyurethane resinous material and the 1,2-polyepoxide occurring at the interface of the two laminae. The minimum amount of the 1,2-polyepoxide film which is necessary to give a required adhesion of 80 pounds per inch width of polyurethane to metal has been determined to be .023 gram per square inch. If amounts lower than this are utilized it has been found that the diffusion at the surface interface of the polyurethane is so great that there is insufficient 1,2-polyepoxide remaining to effect the required bonding to the metal. The film thickness is especially critical when pressure curing of the laminate is used since pressure increases the rate of diffusion at the surface interface. The film thickness of the 1,2-polyepoxide may vary above .023 gram per square inch of metal and still produce bonds having optimum strength. The amount of 1,2-polyepoxide adhesive used depends on the nature of the metal, the 1,2-epoxide resin and polyurethane being laminated. However, it is essential, regardless of the laminate composition, to employ a 1,2-polyepoxide adhesive having a film thickness of at least .023 gram per square inch to obtain a bond having an adhesion of 80 pounds per inch width of metal. The basis of the enhanced bond strength obtained according to this invention is not fully understood, however, it is thought that the diffusion occurring at the 1,2-polyepoxide-polyurethane interface has two effects. First, the diffusion will give a wide graded interface rather than an abrupt glue line. The bond stress will thus be distributed throughout the bonding area rather than limited to the glue line. Second, the penetration allows cross-linking bonds to form between the two resins as shown in (A) below. The cross-linking may occur in various ways depending on the nature of the polyurethane and 1,2-polyepoxide compositions. Thus the mutual diffusion may cause bond formation by reaction of the 1,2-polyepoxide with an isocyanate group as shown in (B) or by the reaction of the isocyanate with the 1,2-polyepoxide as shown in (C) or by the mutual reaction of both polyurethane and 1,2-polyepoxide with a curative derived from either system as shown in (D).

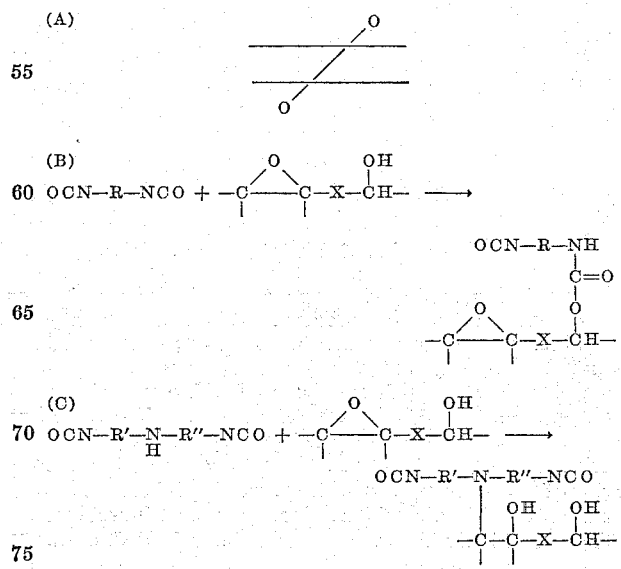

(D)

OCN—R—NCO + NHR'''—R—NHR'''

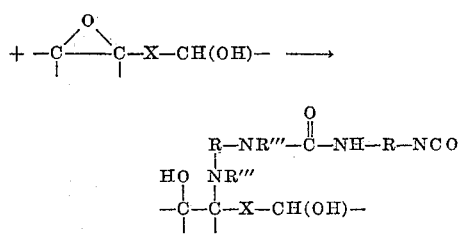

R, R', R'', and R''' may be organic radicals in the above formulas and X may be either an organic or inorganic radical. The above reactions are diagrammatic and exemplary only and not definitive of all possible reactions that may occur at the surface interface.

The rates of diffusion and the extent of diffusion of either the polyurethane into the 1,2-polyepoxide or the 1,2-polyepoxide into the polyurethane will depend on the nature of the respective compositions, i.e. molecular weight, viscosity and mutual solubility coefficients. The rates of diffusion are critical to this invention only in that a minimum diffusion occurs before curing of the polyurethane and 1,2-polyepoxide resins occur.

Metals which may be laminated with a polyurethane according to this invention include iron, steel, aluminum, copper, brass, magnesium, titanium, etc. The adhesion of 1,2-polyepoxide to metals is well known in the art and practically any metal may be utilized in the process of this invention. The 1,2-polyepoxide to be used as an adhesive in this invention is preferably one that is known to have high adhesion for the particular metal used in the laminate.

The following specific examples are illustrative of the details of the invention. It is to be understood that the invention is not limited to the details set forth therein.

The adhesion of a polyurethane to a metal surface was tested in the following manner. A 1 x 1 square inch area of a cleaned 1 x 3 inch metal plate was covered with an 1,2-polyepoxide resin formulation so that a minimum weight of .023 gram of 1,2-polyepoxide resin per square inch area was deposited on the metal. A polyurethane liquid intermediate containing the amine curative was cast on the plate over the 1,2-epoxide adhesive and sufficient time allowed to permit at least a slight inter-diffusion of molecules at the surface interface of the 1,2-epoxide adhesive and the polyurethane. The laminated structure was then heat cured and aged according to standard processes. The adhesion of the cured polyurethane to the metal was tested by pulling the polyurethane from the metal plate at a 90° angle at a rate of two inches per minute. The results are recorded as pound pull per inch width.

EXAMPLE 1

A typical method of cleaning a steel strip for adhering 1,2-polyepoxide and polyurethane laminae according to this invention was as follows. The steel strip was washed with trichloroethylene, vapor degreased with trichloroethylene for 30 seconds and followed with a wash in an alkaline detergent solution for 10 minutes at 160–180° C. The steel strip was then washed with distilled water and dried in an oven at 200° F. Following the drying, the cleaned steel was etched with sulfuric acid followed by a hydrofluoric-nitric acid solution. The etched steel was then rinsed in distilled water and dried in a 200° F. oven.

EXAMPLE 2

A second method of cleaning steel or aluminum strips was as follows. The strip was immersed in liquid trichloroethylene followed by vapor degreasing with trichloroethylene for 30 seconds. The metal was then grit blasted for 1 to 2 minutes with ground walnut shells. The surface was rinsed in tap water and dried in a forced draft oven at 140–150° F.

EXAMPLE 3

A liquid polyurethane resinous casting intermediate was synthesized by reacting polytetramethylene ether glycol with 2,4'-toluene diisocyanate. 3,3'-dichloro-4,4'-diamino diphenylmethane was added to the polyurethane intermediate as a curative. A 1,2-polyepoxide resin consisting of 20% adhesive solids in a 2:1 benzene-acetone solvent was applied to a 1 x 1 inch area of a 1 x 3 inch metal plate cleaned according to the second procedure given above. The above pre-mixed liquid polyurethane casting intermediate was applied while still pourable over the 1,2-polyepoxide and the laminate structure cured in an oven and thereafter aged. The results are summarized below in Table I using different 1,2-epoxide resins.

*Table I*

|   | Epoxy Resin | Epoxy Curative | Pound Pull Per Inch Width |
|---|---|---|---|
| (a) | None | None | 32 |
| (b) | Epon 1004 [1] | do | 67 |
| (c) | do [1] | 8% trimethylene-tetramine | 109 |

[1] Epon 1004 is a commercial 1,2-epoxide resin sold by Shell Chemical Co., and has the formula:
Epon 1004 has a melting point of 95–105° C. and an epoxide equivalent of 870–1025.

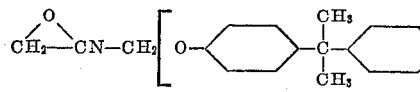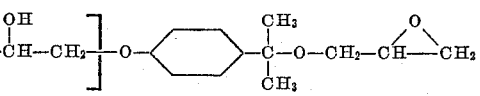

The above results show that the use of a 1,2-epoxide adhesive according to the process of this invention results in an increase in pounds pull from 32 without 1,2-polyepoxide to 109 using the epoxide resin.

EXAMPLE 4

The procedure of Example 3 was repeated substituting an aluminum metal strip for the steel strip used in Example 3. The use of a 1,2-epoxide adhesive of Epon 1004 with a 8% triethylenetetramine 1,2-polyepoxide curative gave an adhesion value of 83 pounds pull per inch width of metal.

EXAMPLE 5

The procedure of Example 3 was repeated using a polytetramethylene ether glycol and 2,4-toluene diisocyanate intermediate and a curative of 3,3'-dichloro-4,4'-diaminodiphenyl. The use of a 1,2-polyepoxide of Epon 1004 with an 8% triethylenetetramine curative gave an adhesion value of 98 pounds pull per inch width of metal.

EXAMPLE 6

The method of Example 3 was repeated using a polyurethane prepared by reacting 2,4-toluene diisocyanate with a polyester consisting of an 80/20 mixture of polyethylene-propylene adipate in a molar ratio of 2.2:1.0. 3,3'-dichloro-4,4'-diaminodiphenylmethane was used as the polyurethane curative. The results are summarized below in Table II.

Table II

| Laminate No. | Metal | Adhesive Solvent | Percent Adhesive Solids | Epoxy Resin | Epoxy Curative | Pound Pull Per Inch Width |
|---|---|---|---|---|---|---|
| (a) | Steel | None | | None | None | 17 |
| (b) | do | do | | Epon 100 [1] | do | 38 |
| (c) | do | Benzene-acetone | 20 | Epon 1004 [1] | do | 61 |
| (d) | do | do | 20 | Epon 1009 [1] | do | 67 |
| (e) | do | do | 20 | Epon 1004 | 8% Triethylenetetramine | 96 |
| (f) | Alum | None | | Epon 100 [1] | None | 54 |
| (g) | Alum | Acetone-Benzene | 10 | Epon 1001 [1] | do | 62 |
| (h) | Alum | do | 10 | do | 8% Triethylenetetramine | 88 |
| (i) | Alum | do | 10 | do | 4% Triethylenetetramine | 58 |
| (j) | Alum | do | 20 | Epon 1004 [1] | 8% Triethylenetetramine | 86 |
| (k) | Alum | do | 10 | Epon 1007 [1] | do | 86 |
| (l) | Alum | | | Epon VI [1] | 8% Diethylenetriamine | 80 |

[1] Epon resins are a commercial 1,2-epoxide resin sold by Shell Chemical Co., and are based on the formula described in Example 3. Epon 1007 is a solid resin having a melting point of 127–133° C. and an epoxide equivalent of 1550–2000. Epon 1001 has a melting point of 64–76 and an epoxide equivalent of 450–525. Epon 1009 has a melting point of 145–155 and an epoxide equivalent of 2400–4000. Eponite 100 has a viscosity of 0.9–1.5 poises at 25° C. and an epoxide equivalent of 140–160.

EXAMPLE 7

The method of Example 3 was repeated using a polyurethane obtained by reacting 4,4'-diphenylmethane diisocyanate with a polyester of an 80/20 polyethylene-propylene adipate (average molecular weight 2000) in a molar ratio of 2.0:1.0.

The polyurethane curative used in (a) was 3,3'-dichloro-4,4'1diaminodiphenylmethane and that used in (b) was 3,3'-dichloro-4,4'-diaminodiphenyl.

Each of the above laminates gave polyurethane to metal bond strengths in excess of 80.

The results are summarized below in Table III.

Table III

| Laminate No. | Metal | Epoxide Solvent | Percent Epoxide Adhesive Solids | Epoxide Resin | Epoxide Curative | Pounds Pull Per Inch Width |
|---|---|---|---|---|---|---|
| (a) | Steel | Benzene-Acetone | 20 | Epon 1009 | None | 150 |
| (b) | do | do | 20 | Epon 1004 | 8% Triethylenetetramine | 96 |

EXAMPLE 8

The method of Example 3 was repeated using the polyurethane of Example 6 in a molar ratio of 2.6:1.0 with a curative of 3,3'-dichloro-4,4'-diaminodiphenyl. Using an Epon 1004 epoxide resin adhesive at 20% solids in a 2/1 acetone-benzene solvent with a 8% triethylene-tetramine curative and a steel plate a bond strength rating of 105 pounds per inch width was obtained.

EXAMPLE 9

The method of Example 3 was repeated using a polyurethane casing system of polytetramethylene ether glycol prereacted with 2,4-toluene diisocyanate with a curing agent of 3,3'-dichloro-4,4'-diamino diphenylmethane. Epon 1004 epoxide resin was used as an adhesive in a 20% solution of benzene-acetone (2/1). An 8% solution of triethylene tetramine was used as the curing agent. The results are summarized below in Table IV.

Table IV

| Laminate No. | Metal | Gm. Wt. of Resin/Sq. Inch Surface | Pounds Inch Width |
|---|---|---|---|
| (a) | Steel | .018 | 75 |
| (b) | do | .023 | 88 |
| (c) | do | .042 | 103 |
| (d) | do | .028 | 102 |
| (e) | Alum | .045 | 91 |

The example shows that when using an 1,2-epoxide resin adhesive having a gram weight per square inch of surface of less than .023 gram per square inch of metal surface the necessary adhesion of 80 pounds per inch width is not obtained. As pointed out before a minimum adhesion of 80 pound per inch width is necessary to produce a bond which has a preferred commercial utility. At .018 gram weight of resin per square inch of surface such a bond is not obtained, whereas at .023 gram weight of resin per square inch of surface a bond is obtained having excellent commercial utility.

EXAMPLE 10

The method of Example 9 was repeated using a 3,3'-dichloro-4,4'-diaminodiphenyl curative for the polyurethane. The results are summarized below in Table V.

Table V

| Laminate No. | Metal | Gm. Wt. of Resin/Sq. Inch Surface | Pounds Per Inch Width |
|---|---|---|---|
| (a) | Steel | .023 | 88 |
| (b) | do | .032 | 110 |

Having thus described our invention, what we claim and desire to protect by Letters Patent is:

1. A process of bonding urethane polymers to metal surfaces with a degree of adhesion of at least 80 pounds per inch at a static 90° pull comprising the steps of coating a metal surface with a layer of fluid, incompletely cured 1,2-epoxide resin containing from about 6 to about 10 parts by weight of an amine curative per hundred parts of resin, said layer having a film thickness of at least 0.023 gram per square inch of metal surface, applying a lamina of fluid, incompletely cured polyurethane prepolymer containing an amine curative upon said layer of 1,2-epoxide resin, and subsequently fully co-curing said 1,2-epoxide resin and said polyurethane prepolymer.

2. The process of claim 1 wherein the polyurethane prepolymer is formed by reacting an aromatic diisocyanate with a member selected from the group consisting of castor oil, diacidglycol polyesters and polyalkylene glycol polyethers.

3. The process of claim 1 wherein the metal is selected from the group consisting of steel and aluminum.

4. A process of bonding urethane polymers to metal surfaces with a degree of adhesion of at least 80 pounds per inch at a static 90° pull comprising the steps of coating a metal surface with a layer of fluid, incompletely cured 1,2-epoxide resin containing from about 6 to about 10 parts by weight of a trialkylene-tetramine curative per hundred parts of resin, said layer having a film thickness of at least 0.023 gram per square inch of metal surface, applying onto said layer of 1,2-epoxide resin a lamina of fluid, incompletely cured polyurethane prepolymer containing as a curative a member selected from the group consisting of 3,3'-dichloro-4,4'-diaminodiphenyl and 3,3'-dichloro-4,4'-diaminodiphenylmethane, said prepolymer being formed by reacting polytetramethylene ether glycol with an aromatic diisocyanate, and subsequently fully co-curing said 1,2-epoxide resin and said polyurethane prepolymer.

5. The process of claim 4 wherein the trialkylenetetramine curative is selected from the class consisting of trimethylenetetramine and triethylenetetramine.

6. A process of bonding urethane polymers to metal surfaces with a degree of adhesion of at least 80 pounds per inch at a static 90° pull comprising the steps of coating a metal surface with a layer of fluid, incompletely cured 1,2-epoxide resin containing from about 6 to about 10 parts by weight of a trialkylenetetramine curative per hundred parts of resin, said layer having a film thickness of at least 0.023 gram per square inch of metal surface, applying a lamina of fluid, incompletely cured polyurethane prepolymer upon said layer of 1,2-epoxide resin, said prepolymer being formed by reacting a polyester consisting of an 80/20 mixture of polyethylene/propylene adipate and having an average molecular weight of 2000 with an aromatic diisocyanate, and said prepolymer containing as a curative a member selected from the group consisting of 3,3'-dichloro-4,4'-diaminodiphenyl and 3,3'-dichloro-4,4'-diaminodiphenylmethane, and subsequently fully co-curing said 1,2-epoxide resin and said polyurethane prepolymer.

References Cited in the file of this patent

UNITED STATES PATENTS

| | | |
|---|---|---|
| 2,577,279 | Simon et al. | Dec. 4, 1951 |
| 2,642,920 | Simon et al. | June 23, 1953 |
| 2,692,873 | Langerak et al. | Oct. 26, 1954 |
| 2,706,166 | Gurney | Apr. 12, 1955 |
| 2,728,702 | Simon et al. | Dec. 27, 1955 |
| 2,806,812 | Merz | Sept. 17, 1957 |
| 2,829,984 | Yaeger | Apr. 8, 1958 |
| 2,858,451 | Silversher | Oct. 28, 1958 |
| 2,888,360 | Sherts et al. | May 26, 1959 |

OTHER REFERENCES

"Epoxy Resins" (Lee and Neville), published 1957 by McGraw-Hill, pages 101 and 160.

Modern Plastics Encyclopedia for 1959, "Foamed Polyurethanes," page 333f; note Molding Polyurethane at page 336.